United States Patent [19]
Murata et al.

[11] 3,826,369
[45] July 30, 1974

[54] FILTRATION PROCESS AND FILTRATION EQUIPMENT

[75] Inventors: Kazuo Murata; Hirotaka Ikeda; Katsuzi Ashida; Uichi Sato, all of Takatsuki, Japan

[73] Assignees: Yuasa Battery Company Limited, Hakuhaicho, Tokotsuki City, Osaka; Yuasa Kiko Company Limited, Takatsuki City, Osaka, both of, Japan

[22] Filed: Dec. 18, 1972

[21] Appl. No.: 316,424

Related U.S. Application Data

[63] Continuation of Ser. No. 159,245, July 2, 1971, abandoned.

[52] U.S. Cl. .................. 210/82, 210/138, 210/387, 210/391
[51] Int. Cl. ............................................ B01d 29/02
[58] Field of Search .................. 210/82–108, 210/138, 387, 391, 393, 398, 399, 400, 500, 506

[56] References Cited
UNITED STATES PATENTS

| | | | |
|---|---|---|---|
| 3,238,056 | 3/1966 | Pall et al. | 210/506 X |
| 3,246,767 | 4/1966 | Pall et al. | 210/506 X |
| 3,305,094 | 2/1967 | Casson | 210/108 |
| 3,333,693 | 8/1967 | Hirs | 210/138 X |
| 3,437,210 | 4/1969 | O'Neill | 210/393 X |

*Primary Examiner*—John Adee
*Attorney, Agent, or Firm*—Watson, Cole, Grindle & Watson

[57] ABSTRACT

This invention provides a filtration process capable of intermittent repetition wherein the prefilt is fed under pressure to one section of a pair of containers compressed to a watertight closure through a filter medium and the filtrate is discharged from another section of said containers, the backwash process wherein the filtrate is fed under pressure in the reverse direction of the filtration process, while said filtration process is suspended, to remove plugging of said filter medium, and the filter medium exchange process wherein said filter medium is moved for replacement by a new one, subsequent to said filtration process and backwash process alternately repeated predetermined times. This invention relates to a process and equipment which enable one to filter with ease and certaintly extremely fine particles using the special microporous substance.

5 Claims, 5 Drawing Figures

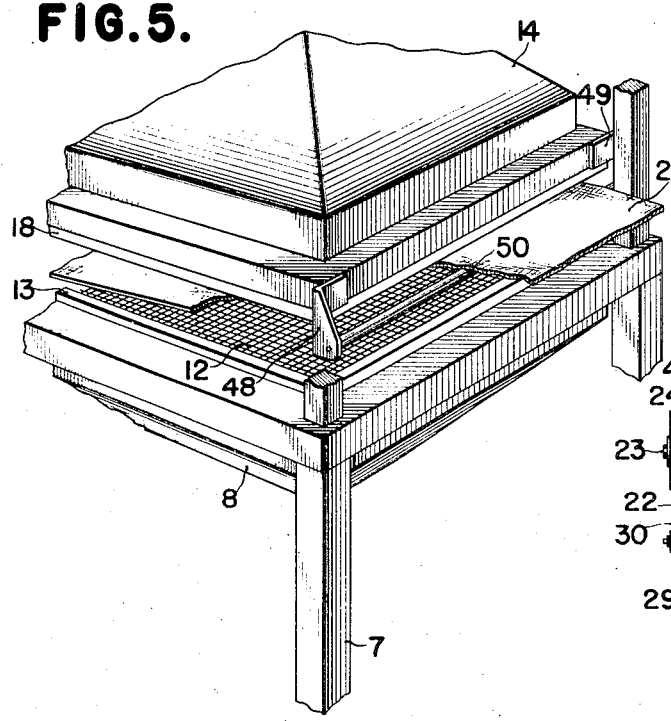
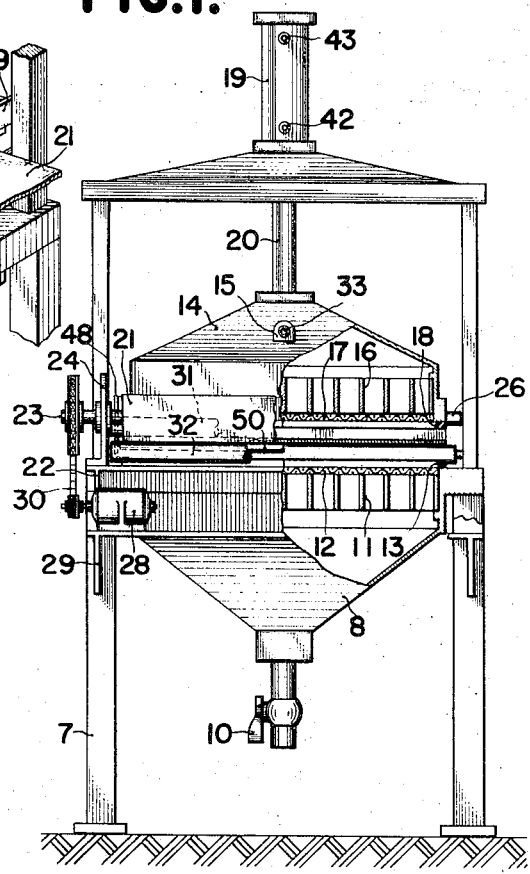
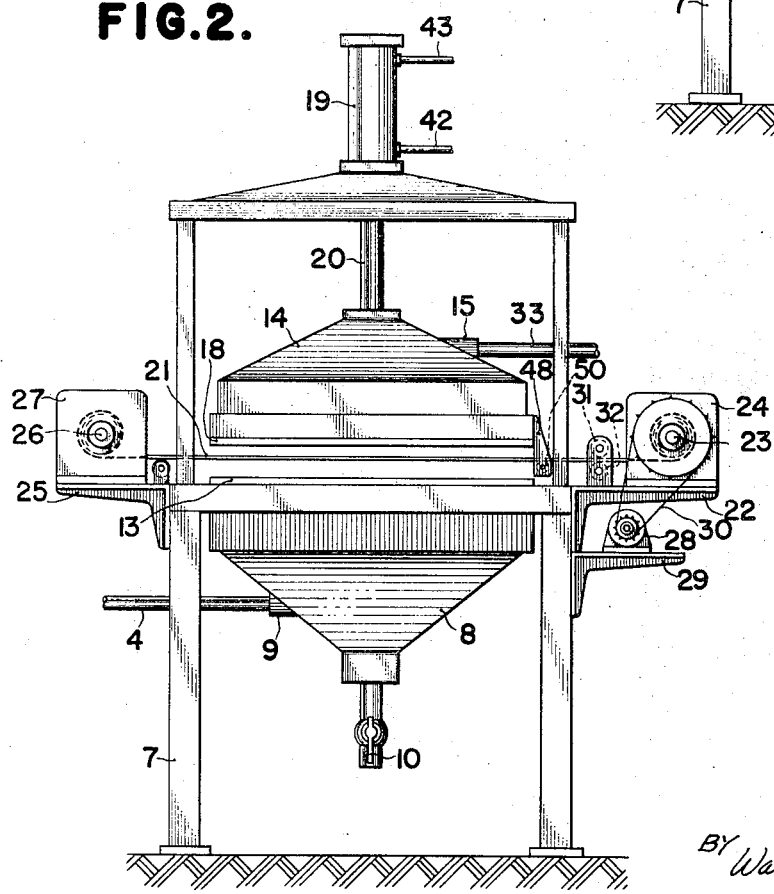

INVENTORS,
KATSUO MURATA
HIROTAKA IKEDA
KATSUZI ASHIDA
UICHI SATO

FILTRATION PROCESS AND FILTRATION EQUIPMENT

This is a continuation of application Ser. No. 159,245 filed July 2, 1971 now abandoned.

This invention relates to a filtration process and an apparatus wherein waste water, service water, or other polluted fluids (hereinafter called the prefilt) are treated for clarification.

Up to now, waste fluids containing such heavy metals as cadmium, lead, chromium, etc. have been treated by sedimenting pollutants by convection for a long time, with subsequent discharging of supernatant fraction, in a neutralizing basin which requires a large area of site, or by another method which employs a centrifugal separator to separate solids from waste fluids. With these processes it is extremely difficult to decrease the content of heavy metals contained in the discharge fluid to a level harmless to human bodies, and if such a level is to be attained, an enormous amount of expense and an extensive area of site will be required, which poses a problem on the adoption of such a process.

Fabrics of polyester, vinyl chloride, vinyl chloride-vinylidene chloride copolymer (trade name Saran), etc. and sintered or pressed powder of polyethylene, vinyl chloride, etc. are in use as the filter media. Due to the pore diameter as large as several tens micron to several thousands micron, these filter media have an extremely low filtration efficiency for the early plugging, giving the filtrate almost the same as the prefilt, when used for filtration of waste fluids of cadmium, silver, chromium, etc.

The first object of this invention is to provide a filtration process and filtration equipment superior in the filtration performance.

The second object of this invention is to provide a filtration equipment which employs a microporous substance with fine pores as a filter medium.

The third object of this invention is to provide a filtration process and filtration equipment which performs efficient filtration automatically.

The fourth object of this invention is to provide a filtration process and filtration equipment which performs filtration economically.

The fifth object of this invention is to provide a means to improve the living environment and contribute to the public society.

Reference will now be made to the accompanying drawings in which:

FIG. 1 is a front view of the major components, of the filtration equipment of one example of this invention shown partly broken away.

FIG. 2 is a side elevational view of the apparatus shown in FIG. 1.

FIG. 5 is a perspective showing the improved major components of an apparatus in accordance with this invention.

The filtration process of this invention is based on the involves an intermittently repeating filtration process wnerein the prefilt is fed under pressure to one section of a pair of containers compressed to a watertight closure through a filter medium and the filtrate is discharged from another section of said containers, the backwash process wherein the filtrate is fed under pressure in the reverse direction of the filtration process, while said filtration process is suspended, to remove plugging of said filter medium, and the filter medium exchange process wherein said filter medium is moved for replacement by a new one, subsequent to said filtration process and backwash process alternately repeated predetermined times.

This filtration process can decrease the concentration of pollutants, e.g., cadium and lead in the filtrate to as low as 0.03 ppm and 0.08 ppm, respectively, giving an unprecedented clear filtrate.

Figure 3:
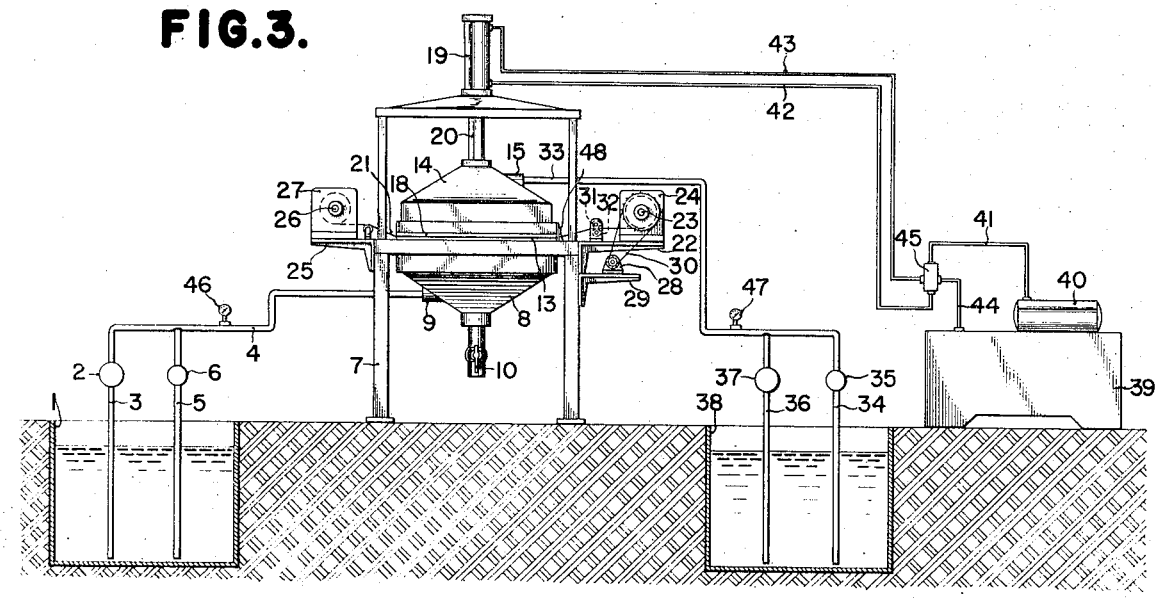
FIG. 3 is a system diagram for filtration using the apparatus of FIG. 1.

Referring now to FIG. 3, there is shown a prefilt tank 1, a feed pump ($PM_1$) 2, a transferring pipe 3 for the prefilt, a feed pipe 4, a discharge pipe 5 for backwash, a backwash valve ($SV_2$) 6, a frame 7 of the apparatus, a container 8 at the prefilt side, an inlet 9 for the prefilt, a drain cock 10 to discharge precipitates, a latticelike member 11 provided in the container 8, a metal mesh 12 supported by member 11, a packing 13, a container 14 at the filtrate side, an outlet 15 to discharge the filtrate, a member, mesh, and packing 16, 17, and 18, respectively, provided in the container at the filtrate side, a hydraulic pressure cylinder 19, a hydraulic pressure axis 20, a filter medium 21 in sheet form inserted between containers 8 and 14, a frame 22 to wind up the filter medium, and a shaft 23 to wind up the filter medium. A bearing 24 is also shown for shaft 23, a frame 25 supporting, a shaft 26 to rewind the filter medium, a bearing 27 of the shaft, a motor 28 to wind up the filter medium, a frame 29 for the motor, a chain 30, counters ($CC_2$) 31 and 32 to measure the length of the filter medium to detect the length of movement of the filter medium, a water feed pipe 33, a discharge pipe 34 for the filtrate, a water feed valve ($SV_1$) 35, a water feed pipe 36 for backwash, a backwash pump ($PM_2$) 37, a filtrate tank 38, a hydraulic pressure unit 39, a hydraulic oil pump ($M_2$) 40, hydraultic oil transfer pipes 41, 42, 43, and 44, a hydraulic oil change-over valve ($SV_4$) 45, and water pressure gauges 46 and 47.

The filtration process of this invention will now be described referring to the illustrated equipment.

At first the backwash valve 6 is closed and the water feed valve 35 is left open. When the prefilt in the prefilt tank 1 is fed to the container 8 at the prefilt side by means of the feed pump 2 through the prefile transfer pipe 3, the feed pipe 4, and the prefilt inlet 9, the prefilt is filtered while it passes through the metal mesh 12 in the container and the filter medium 21 placed on the metal mesh. The filtrate enters the container 14 at the filtrate side through the mesh 17 and further enters the filtrate tank 38 through the discharge outlet 15, the water feed pipe 33, and the water feed valve 35.

During this process the containers 8 and 14 are compressed toward each other to form a watertight closure about the filter medium 21 by means of the hydraulic pressure unit consisting of the hydraulic pressure cylinder 19, the hydraulic pressure axis 20, the hydraulic pump 40, the hydraulic oil transfer pipes 41, 42, 43 and 44, and the hydraulic oil change-over valve 45. Should the filter medium 21 be clogged by solids during use thereby, decreasing the filtration performance, the filter medium may be backwashed as follows in order to remove such solids.

At first the water feed valve 35 is closed and the backwash valve 6 is opened. Fluid in the filtrate tank 38 is allowed to pass through the containers 14 and 8 by means of the backwash pump 37 through the backwash water feed pipe 36 and the water feed pipe 37, in the reverse direction of the filtration process, and is further recycled to the prefilt tank 1 through the feed pipe 4, the backwash valve 6, and the backwash discharge pipe 5. The backwash may be accomplished in as short time as one fraction of several tens of hours for water feed during filtration.

The backwash accomplished intermittently at intervals of filtration is advantageous because the filter medium can be used repeatedly. Nevertheless, after repetition of several to several-tens cycles of this process, the plugging of the filter medium increases gradually, resulting in the decrease of the filtration efficiency and eventually the filter medium becomes useless. Thus, it is necessary to replace such a discarded filter medium by a new one. The process for replacement is described below.

After the predetermined number of cycles of filtration and backwash have been finished, the hydraulic oil change-over valve 45 between the hydraulic oil pump 40 and the hydraulic pressure cylinder 19 of the hydraulic pressure unit 39 is switched to activate the hydraulic pressure cylinder 19. Then, the container at the filtrate side 14 is lifted by means of the hydraulic pressure axis 20, and during this period the clogged waste filter medium is moved by a predetermined length by means of the filter medium windup mechanism consisting of the said members 22–32, to be replaced by a new one. In the filter medium windup mechanism a certain length of the filter medium 21 in a sheet form is wound up on the shaft 26 mounted on the bearing 27 attached to the rewind frame 25. Since one end of the filter medium is wound up on the windup shaft 23 inserted in the bearing 24 attached to the windup frame 22, as shaft 23 is driven to rotate by means of the windup motor 28 and the chain 30, the waste filter medium is wound up on the said shaft and replaced by a new one.

After the replacement of the filter medium has been completed, in such manner, the hydraulic oil change-over valve 45 is switched to the original position, and the container 14 at the filtrate side is lowered and compressed toward the container at the prefilt side 8. Thus, the equipment is ready again for filtration, and thereafter the above-mentioned process is repeated.

In replacement of the waste filter medium by a new one the length of the filter medium to be moved varies depending on the size of the equipment, but a provision is made to adjust the length in which the counters to measure the length of wound up filter medium 31 and 32 detect the length of movement and stop the windup motor 28, when the filter medium has moved a predetermined length.

Now, the equipment of this invention is so arranged that all of the above-mentioned actions are accomplished automatically. The mechanism is described in detail referring to FIG. 4.

1. At first, the electromagnetic switch $MS_4$ for the hydraulic oil pump, and then the said electromagnetic switch self-supports the contact $MS_{4-1}$ at the ON position and the hydraulic oil pump $M_2$ (40 in FIG. 3) is actuated.

2. After the oil pressure of the hydraulic oil pump $M_2$ has increased, the pushbutton $PB_3$ for operation of the equipment is pressed. Then, the auxiliary relay $X_1$ is turned on and this contact $X_{1-1}$ of the relay self-supports at the ON position, and with the contact $X_{1-2}$ of the said relay on, the hydraulic oil change-over valve $SV_4$ (45 in FIG. 3) is actuated and the containers (8, 14 in FIG. 2 and FIG. 3) are compressed toward each other to a watertight closure.

3. After the containers have been closed, the limit switch $LS_2$ is turned on and the electromagnetic switch $MS_1$ to actuate the water feed pump is turned on to actuate the water feed pump $PM_1$ (2 in FIG. 3). At the same time the water feed timer $T_1$ is turned on, and the water feed valve $SV_1$ (35 in FIG. 3) is opened, with the b contact $X_{2-3}$ of the auxiliary relay $X_2$ on. Thus, the filtration is started.

4. When a predetermined time of the timer $T_1$ has been reached after filtration, the backwash timer $T_2$ and the auxiliary relay $X_2$ are turned on, and at the same time the electromagnetic counter (to count the number of cycles of filtration) $CC_1$ is turned on. The auxiliary relay $X_2$ self-supports the contact $X_{2-1}$ at the ON position, and with the contact $X_{2-2}$ of the said auxiliary relay on, the electromagnetic switch $MS_2$ to actuate the backwash water feed pump is turned on to actuate the backwash water feed pump $PM_2$ (37 in FIG. 3), and at the same time to open the backwash valve $SV_2$ (6 in FIG. 3). With the b contact $MS_{2-1}$ of the said electromagnetic switch off, the solenoid switch $MS_1$ to actuate the water feed pump is turned off to stop the water feed pump $PM_1$. At the same time, the water feed timer $T_1$ returns to the original position. With the b contact $X_{2-3}$ of the auxiliary relay $X_2$ off, the water feed valve $SV_1$ is closed and the backwash is started.

5. Then, when a predetermined time of the backwash timer $T_2$ has been reached, the auxiliary relay $X_2$ suspends self-support, and $X_2$ and the backwash timer $T_2$ return to the original position. When the auxiliary relay $X_2$ is turned off, the electromagnetic switch $MS_2$ to actuate the backwash pump is turned off, with the contact $X_{2-2}$ of the relay off, and the backwash pump $PM_2$ is suspended and simultaneously the backwash valve $SV_2$ is closed. With contact $X_{2-3}$ on, the water feed valve $SV_1$ is opened. And, when the electromagnetic switch $MS_2$ to actuate the backwash pump is turned off, with the contact $MS_{2-1}$ of the said switch on, the electromagnetic switch $MS_1$ to actuate the water feed pump and the water feed timer $T_1$ are turned on; thus, the water feed pump $PM_1$ is actuated and the filtration is started.

6. When the actions of the above 3–5 steps have repeated the predetermined number of the filtration process, the electromagnetic counter $CC_1$ is actuated, with the contact $CC_{1-1}$ of the said counter on, and the auxiliary relay $X_3$ is turned on. The auxiliary relay $X_3$ self-supports with the contact $X_{3-4}$ of the auxiliary relay on, and the auxiliary relay $X_1$ is turned off with the b contact $X_{3-1}$ of the auxiliary relay off. Thus, the hydraulic pressure oil change-over valve $SV_a$ is returned to the original position to release the compression of the containers.

7. When the containers have been released, the limit switch $LS_1$ is turned on and the electromagnetic switch $MS_3$ to actuate the filter medium windup motor is turned on to actuate the filter medium windup motor $M_1$ (28 in FIG. 2 and FIG. 3). Thus, the replacement of the filter medium is started.

8. When the filter medium has been wound up by the action of the filter medium windup motor $M_1$ a certain length predetermined by the filter medium windup length counter $CC_2$ (31 and 32 in FIG. 2 and FIG. 3), the auxiliary relay $X_1$ is turned on, with the contact $CC_{2-1}$ of the counter on, and the containers are closed again. With the contact $CC_{2-2}$ off, the electromagnetic switch $MS_3$ is turned off, and the filter medium windup motor $M_1$ stops; thus the replacement of the filter medium is finished.

9. From this time on, the actions of the above 3–8 steps are repeated automatically.

Figure 4:
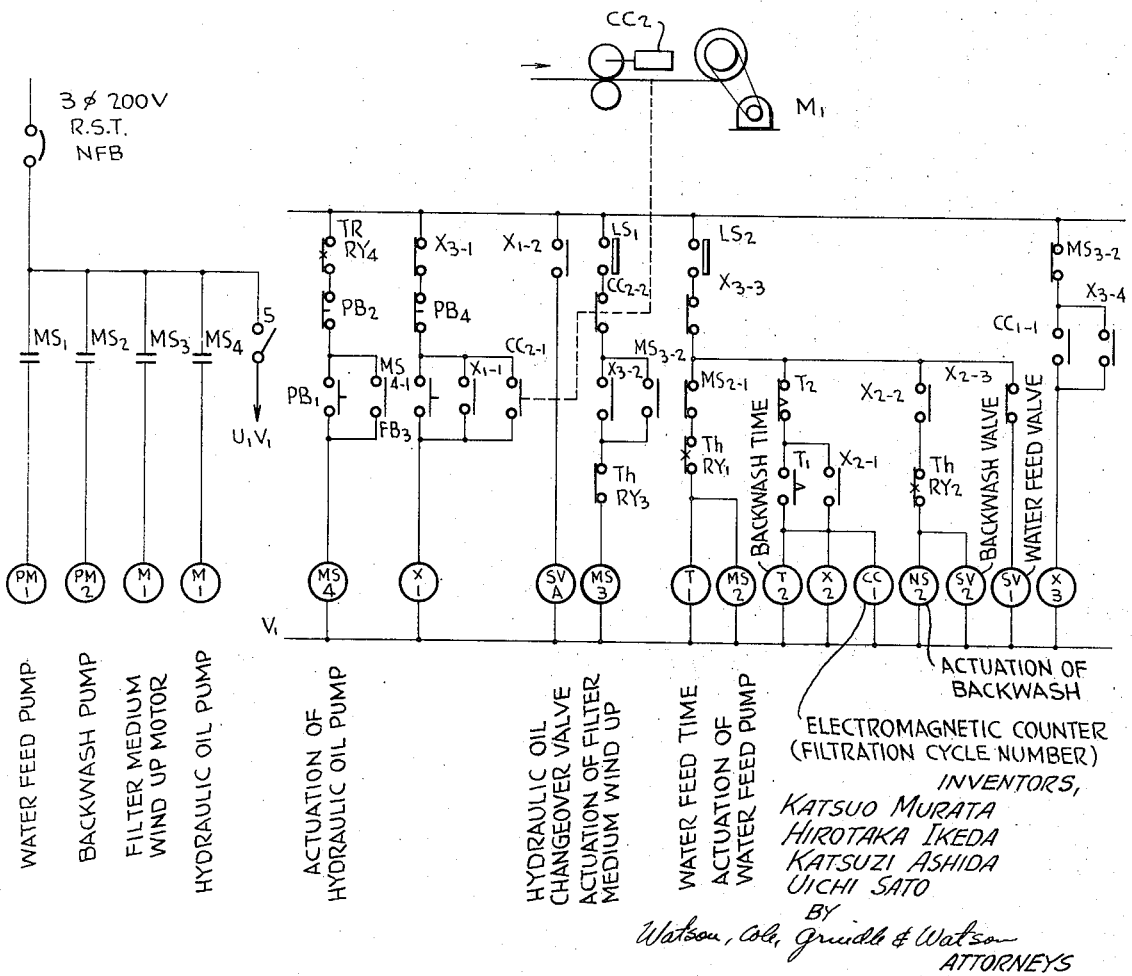
FIG. 4 is a wiring diagram for the operating system.

$PB_2$ and $PB_4$ in FIG. 4 denote the hydraulic oil pump $M_2$ and the stop pushbutton of the equipment, respectively.

This invention enables one to accomplish such operations as filtration, washing of filter medium by backwash, replacement of filter medium, etc. continuously and automatically, and to filter the prefilt with extreme efficiency. And yet the filter medium can be used for a longer period of time than the usual filtration process, since the filter medium is washed repeatedly during the filtration process. When the filter medium 21 is wound up after a repetition of filtration process several times in the equipment according to the invention, the filter medium adheres to the metal mesh 12 of the container 8, which may cause the filter medium to be damaged. In order to prevent such damage, the upper container 14 is provided at its end with a pair of hooks 48, 49 supporting a rollable bar 50, on which the filter medium is allowed to pass as shown in FIG. 5. The length of the hook is preferably about one half of the distance between the upper container 14 and the lower container 8 when the former is in a lifted position. As the container 14 is lifted, the bar 50 connected to the hooks is also lifted, whereby the filter medium 21 is stripped off the metal mesh surface of container 8. Thus, the filter medium is not damaged during wind up. Therefore, the filtration process and the filtration equipment of this invention are most suitable for the treatment to clarify a great quantity of various kinds of polluted fluids. Especially, when a microporous sheet with fine pores several hundred A to several microns in diameter made of such synthetic resin as polyvinyl chloride, polystyren, etc., such solvent as tetraphydrofuran, and such non-solvent as isopropyl alcohol, ethyl alcohol, etc., is used as a filter medium, such toxic heavy metals as cadmium, lead, etc. contained in the waste water from factories can be removed to a great extent. Thus, the present invention is extremely useful as a means to remove substances that may cause the pollution problem.

Examples are given in the following.

Example 1

A uniform synthetic resin solution prepared by dissolving 7 parts of heat-resistant polyvinyl chloride (trade name Nikatemp, made by Nihon Carbide) in 63 parts of tetraphydrofuran solvent, with subsequent addition of 30 parts of isopropyl alcohol as a non-solvent, was applied to a 0.1 mm thick polyester non-woven fabric and dried by evaporation. A microporous substance with an average pore diameter of 3.4 micron was obtained. Using this microporous substance as a filter medium for the equipments as illustrated in FIG. 1 to FIG. 4, waste water containing cadmium hydroxide (at a concentration of 50 ppm) was fed in the right direction for 2 minutes, and then the filtrate was fed under pressure in the backwash direction for 3 seconds. The filtrate obtained by the repetation of this process was found to contain 0.03 ppm of pollutant. Thus, a completely clarified filtrate could be obtained as against the standard concentration of 0.1 ppm for the factory waste water.

Example 2

A uniform synthetic resin solution prepared by dissolving 7 parts of polyvinyl chloride (Arron PVC NS1100 made by Toa Gosei) in 63 parts of tetraphydrofuran, with subsequent addition of 30 parts of ethyl alcohol, was applied to a 0.17 mm thick polyester non-woven fabric and dried by evaporation. A microporous substance with an average pore diameter of 0.6 micron was obtained. Using this microporous substance as a filter medium as in Example 1, the same result was obtained.

Example 3

A uniform synthetic resin solution prepared by dissolving 8 parts of polystyrene in 62 parts of tetraphydrofuran, with subsequent addition of 30 parts of isopropyl alcohol, was applied to a saran screen and dried by evaporation. A microporous substance with an average pore diameter of 5 micron was obtained. Using this microporous substance as a filter medium as in Example 1, the same result was obtained.

Example 4

A synthetic resin solution prepared by dissolving 15 parts of polyvinyl fluoride (trade name Kureha K-F Polymer) in 85 parts of dimethylformamide solvent was applied to a polyester non-woven fabric and then soaked in water is a non-solvent. A microporous substance with an average pore diameter of 0.3 micron was obtained. This filter medium exhibited an extremely remarkable effect as an acid- and alkali-resistance filter medium, when used as in Example 1.

Example 5

A uniform resin solution prepared by dissolving 7 parts of copolycondensate of dichlorodiphenyl sulfone and bisphenol (trade name Polysulfone) in 63 parts of chloroform solvent, with subsequent addition of 30 parts of isopropyl alcohol and 5 parts of titanium oxide fine powder, was applied to a polyethylene screen and dried by evaporation. A hydrophilic and acid- and alkali-resistant microporous substance with an average pore diameter of 0.3 micron was obtained. Using this microporous substance as a filter medium as in Example 1, an extremely remarkable effect was obtained.

Example 6

Using the microporous substance obtained in Example 1 as a filter miedum, the waste water containing 10 ppm of lead was filtered under the same conditions as Example 1. The resultant filtrate was clarfied to as low as 0.1 ppm. Since the standard allowable concentration for lead waste water is 1 ppm, the above filtrate corresponds to one-tenth of this standard concentration. Thus, an outstanding filtration result was obtained.

Example 7

Using the microporous substance obtained in Example 1 as a filter medium, and adding activated charcoal or chelate resin for adsorption of mercury to the filtration container at the prefilt side, ethyl mercury waste water (concentration 20 ppm) was filtered under the same conditions as Example 1. The concentration of the filtrate was below 0.01 ppm, which is 5 to 10 times effective as compared with the conventional process with ion exchange resin.

Example 8

A uniform synthetic resin solution prepared by dissolving 14 parts of polystyren (trade name Styrone 683) in 56 parts of tetrahydrofuran, with subsequent addition of 30 parts of isopropyl alocohol and 5 parts of silica (trade name Aerosil), was applied to a polyester non-woven fabric and dried by evaporation. A hydrophilic microporous substance with an average pore diameter of 4 microns was obtained. Using this substance as a filter medium and adding such adsorbent as activated charcoal, ion exchange resin, zeolite, etc. in the filtration container at the prefilt side, dye waste water colored with such organic dye as methylene blue (concentration 500 ppm) was filtered. The resultant filtrate was extremely clear at a concentration below 1 ppm.

As described in the above, the filtration of this invention in which the filtration process, backwash process, and filter medium replacement process are repeated intermittently accomplished an unprecedented result, when a microporous substance was used as a filter medium. The preferred average pore diameter of the microporous substance is in the range of 200 A to 10 microns; below 200 A considerable trouble is encountered in the practical use due to plugging and slow filtration speed. Conversely, above 10 microns the micro porous substance has no filtering effect as with an ordinary non-woven fabric.

The microporous substance used in this invention is charged negatively and has the adsorption effect due to this charge, which makes it very effective for the filtration of waste water in a suspension state. The process to convert a usual waste fluid to a suspension, or the process to grow particles in a waste fluid in an extremely effective means to increase the effect of removal of pollutants. For instance, addition of such coagulant as calcium hydroxide to a waste fluid for sedimentation or growth of particles is extremely effective to create a favorable condition for filtration.

The microporous substance used in this invention consists of a combination of synthetic resin, solvent, and non-solvent; acrylonitrile, methyl metacrylate, vinyl chloride-vinylidene chloride copolymer, and other thermoplastic synthetic resins soluble in solvents can be applied as the synthetic resin.

With regard to solvent and non-solvent, any kind of combination can be used as far as they form a uniform mixture liquid. The kind and quantity of the said solvent and non-solvent may be properly selected in order to adjust the average pore diameter in accordance with the object to be filtered. The filter medium used in this invention may be of any type of microporous substance with a pore diameter of 200 A to 10 microns. For instance, a porous substance with an average pore diameter of 0.8 micron prepared by treating linter pulp with phenol may be of use. However, microporous substances prepared by the combination of synthetic resin, solvent, and non-solvent are especially suitable in view of plugging the backwash effect. It is also extremely effective to add such organic or inorganic substance as activated charcoal, ion exchange resin, zeolite, diatomaceous earth, etc., individually or in combination, to the prefilt of the filtration equipment in order to increase the effect of ion adsorption and filtration. Not only waste fluids containing such heavy metal as cadmium, copper, lead iron, zinc, etc., but waste fluide containing organic dyes and pigments and any kind of polluted waste fluids can be treated for clarification in a great quantity. This is one of features of this invention.

The recycling time for the filtration process and backwash process in accordance with this invention is not limited and may be properly determined depending on the state and kind of the prefilt, other than 2 minutes for the filtration process and 3 seconds for the backwash process as illustrated in the Examples.

As described in the above, this invention enables one to accomplish all the operation for filtration, backwash of filter medium, and replacement of filter medium automatically and continuously and to filter the prefilt with extreme efficiency. Moreover, since the filter medium is washed repeatedly during the operation, this invention enables one to use the filter medium for a longer time than the usual filtration process. Therefore, the filtration process in accordance with this invention is most suitable to treat for clarification various kinds of polluted fluids in a large quantity. Since this invention enables one to remove to a great extent such toxic heavy metal as cadmium, lead, etc. contained in waste water from factories, this invention is extremely effective as a means to eliminate pollutants.

A preferred embodiment of this invention was illustrated in the above examples, but it will be understood that the invention is not to be limited to the exact process and equipment shown and described, but that without departing from the spirit and scope of the invention various changes and modifications may be made, for instance, the above-mentioned pair of containers may be installed in parallel in plural number, or may be installed horizontally instead of vertically as illustrated in the above-mentioned examples.

What is claimed is:

1. A filtration process comprising the steps of:
   a. feeding fluid to be filtered (prefilt) under pressure in one direction into a lower container to filter the prefilt through a filter medium disposed between the lower container and an upper container, said containers being compressed together into a watertight closure about said filter medium;
   b. suspending said filtering and feeding filtrate under pressure into said lower container from said upper container in a direction reverse of said one direction of the filtering thereby removing plugging of said filter medium,
   c. repeating step *a* process and step *b* process alternately at predetermined intervals,
   d. lifting said upper container for changing said filter medium, and thereafter moving said filter medium from a winding frame for replacement by another filter medium.

2. A filtration process according to claim 1, further comprising the steps of; stripping off the filter medium from the lower container by means of a bar, as the upper container is lifted.

3. Filtration apparatus comprising, a pair of containers including an upper container and a lower container compressed toward one another into a watertight closure about a filter medium, each said container having a metal mesh supported by a lattice-like member therein and a packing extending about the perimeter of said metal mesh, a feed pipe connecting an inlet of said lower container from a prefilt tank to pass a quantity of prefilt into said lower container, a water feed pipe for discharging a filtrate into a filtrate tank from an outlet of said upper container, a hydraulic pressure unit to compress or release the said containers toward and away from each other, a hydraulic pressure cylinder for moving said containers toward and away from one another through transfer pipes from a hydraulic oil pump having a hydraulic oil change-over valve, a wind-up mechanism having a filter medium wind-up length counter and a filter medium wind-up motor for moving said filter medium which is disposed between said containers by a predetermined length, a control mechanism comprising the combination of electromagnetic switches, relays, limit switches, timers which intermittently open and close a water feed valve and a backwash valve for alternately passing a quantity of the prefilt into said lower container and discharging filtrate from said upper container, said combination serving also to actuate and stop a water feed pump and backwash pump, and to actuate said filter medium wind-up mechanism after the filtration and backwash have been repeated a predetermined number of times, and further to interlock these actions with said hydraulic pressure unit and filter wind-up mechanism intermittently.

4. The filtration apparatus according to claim 3, wherein said filter medium is a microporous substance with an average pore diameter of 200A to 10 microns.

5. The filtration apparatus according to claim 3, wherein a pair of hooks are provided at one end of the container at the filtrate side and a mechanism is provided which lifts and strips off the filter medium from the container at the prefilt side by means of a bar, which is below the filter medium and connected to the hooks, as said container at the prefilt side is lifted.

* * * * *